March 21, 1933.  C. A. RUDQVIST  1,901,988

POWER TRANSMISSION

Original Filed May 16, 1928

INVENTOR
Carl August Rudqvist
BY
Wm T Hedlund
his ATTORNEY

Patented Mar. 21, 1933

1,901,988

UNITED STATES PATENT OFFICE

CARL AUGUST RUDQVIST, OF STOCKHOLM, SWEDEN, ASSIGNOR TO PULVIS AKTIEN-GESELLSCHAFT, OF GLARUS, SWITZERLAND, A CORPORATION OF SWITZERLAND

POWER TRANSMISSION

Continuation of application Serial No. 278,271, filed May 16, 1928, and in Sweden January 9, 1928. This application filed May 14, 1930. Serial No. 452,389.

This application is a continuing application with respect to my copending application Serial No. 278,271, filed May 16th, 1928, for improvements in clutching devices, and is to be considered as relating back thereto, for common subject matter, and to the rights thereof.

My invention relates to power transmission. More particularly my invention relates to clutches for coupling a rotary driving member to a member to be driven rotationally at the same speed.

My present invention aims to produce a power transmission apparatus which combines the features of low starting torque, gradual speeding up to direct drive, drive through finely divided material and the packing of finely divided material to provide overload release, and overrunning of the clutch without appreciable drag. While my primary object is to provide a clutch with all these features included therein, various of these features may be used in clutches without including other features.

In general, my invention relates to the type of power transmission apparatus and method set forth in my copending application, Serial No. 411,029, filed December 2nd, 1929, Pat. No. 1,830,564 and one object of my invention is to provide a clutch of that type having means for moving the projecting elements so as to permit overrunning of the clutch or otherwise to permit relative movement of the driving and driven members without resistance or without appreciable resistance or drag.

Another object of my invention is to provide an overrunning clutch of general nature and application wherein pressure of finely divided material moves one or more elements to permit overrunning.

The nature of the invention will become apparent from a consideration of the following description taken in conjunction with the accompanying drawing showing a clutch in accordance with the invention.

Figure 1:
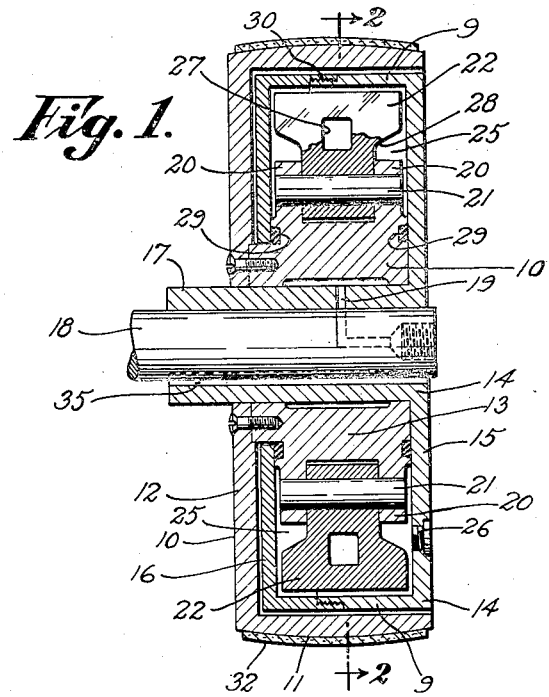
Figure 2:
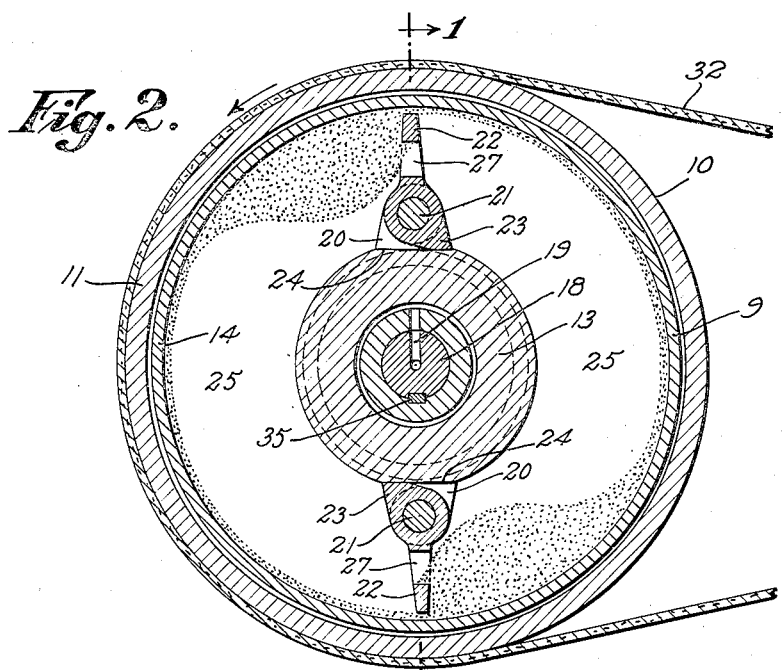

With reference to the accompanying drawing:

Fig. 1 is an axial transverse section of a clutch taken on the line 1—1 of Fig. 2; and Fig. 2 is a section taken on the line 2—2 of Fig. 1.

The clutch comprises a driving member 10 in the form of a pulley wheel having an outer circumferential pulley surface 11, a transverse wall 12 and a hub portion 13. The driving member is journaled on the driven member 14, which comprises transverse walls 15 and 16, an outside wall 9 and a hub portion 17. Hub portion 17 is secured to a shaft 18 as by key 35. Oil is supplied through the channel 19 to lubricate the relatively moving surfaces between the hub portion 13 of the driving member and the hub portion 17 of the driven member. The driving and driven members are coaxially mounted on the shaft 18.

Extending outwardly from diametrically opposed parts of the hub portion 13 of the driving member are projections 20 in which are situated pins 21 serving as pivots for blade elements 22. The projections 20 extend outwardly at each side of the hub portion 13, and the blade elements are, in part, situated within the projections 20. The parts of the blade elements situated between the projections 20 are provided with lugs or abutments 23 which, when the blade elements are radially extended, engage flattened surfaces 24 on the hub portion 13.

A chamber 25 is formed between the driving and driven members. This chamber is partly and only partly filled with a finely divided material. I prefer to use what might be termed ferrous powder consisting of particles of metal of a diameter of from 0.1 to 0.7 millimeters and consisting of about ninety-four percent iron, about three percent carbon and some manganese, phosphorous sulphur, silicon and the like, as is usual with iron of such character, together with a small amount of powdered graphite, that is, preferably less than 5% of graphite to ferrous particles. A port and a closure 26 therefor are provided in the driven member giving access to chamber 25 whereby the amount of finely divided material therein may be regulater to suit desired operating characteristics of the clutch. Each blade element 22 has axially extending side surfaces and an axially extending outer surface, but is provided with a port 27 and is cut away at the ends as shown at 28 permitting material to flow past the blade element at points thereof nearer the axis of rotation. Packing 29 is provided between the hub portion 13 of the driving element and the walls of the driven element. The driven element may be made up of two parts screwed together at 30.

In operation of the clutch the driving member 10 is rotated in the direction of the arrow as by a belt 32 driven by a motor. Obviously the driving member may be driven otherwise than by a belt. The ultimate member to be driven is connected to the shaft 18. When the clutch is first started the finely divided material will rest in the lower part of the chamber 25. As the clutch starts, the blade elements contact the finely divided material and move it. There is slippage at first and, although the driving member immediately or very soon gets up to full speed, the driven member approaches full speed more slowly. As the speed picks up, drifts are formed in front of the blade elements 22, as is shown on the drawing. The front surfaces may be said to be axially extending driving surfaces. Centrifugal force due to rotation packs these drifts to transform the pliable mass of finely divided material into a fixed acting mass. The blade elements assume radial position due to the reactionary pressure of the drifts against them. The radial position is determined by the abutments 23, which abutments, as shown on the drawing, are on the after sides of the blades, with reference to the direction of rotation.

After a short period of acceleration, the driven member comes up to synchronous speed with the driving member and the clutch transmits power in a one-to-one ratio through the mass of finely divided material which has been packed by centrifugal action. The power is transmitted solely through the mass of finely divided material. This is important because the mass has an internal friction which is fixed for a given quantity and a given kind of material and given operating conditions, so that, if the load exceeds a certain amount, for a given speed, the internal friction will be overcome and the finely divided material will give or yield, thus providing overload release. I use only a limited amount of finely divided material in chamber 25 so that, when the internal friction is overcome and the fixed drift is disrupted, the resistance drops to a relatively low value and there is a minimum of drag. I utilize a homogeneous mass, or substantially homogeneous mass, the internal friction of which is constant for similar conditions and, since the packing of the material depends on centrifugal force and centrifugal force varies as the square of the speed of revolution, and since a given amount of material assumes a certain shape under given conditions, a given structure with a given amount of material of given nature will always slip or release at the same value of force (or substantially the same) applied for the same speed. Thus I provide a positive and definite overload release combined with light starting load without the necessity of providing special motor indings in the case of electric motors or other safety appliances or unloading devices. The port and its closure 26 constitute means for varying the amount of finely divided material in chamber 25. For a given speed, the value of overload release can be varied by varying the amount of finely divided material in chamber 25.

My present clutch is especially designed to take care of cases where it is desirable to have the clutch overrun without having any or practically any drag on the relatively moving parts. For example, in certain separators and centrifuges, it is desirable when the motor is cut off, that the rotating driven parts continue to run without the drag of the motor. Elimination of drag permits the overrunning parts to run longer and prevents likelihood of injury to mechanism.

Assume now that the motor is cut off so that there is a tendency for the driving member to move slower than the driven member. We may assume that under this condition the driven member 14 goes fasten than the driving member. This means that the member 14, including outside wall 9 thereof (Fig. 2), is moving faster than the hub portion 13. It will readily be seen that with fixed blades in place of the pivoted blades 22, there might be a resistance or drag set up through the finely divided material. However, with my present clutch, when this occurs, the finely divided material, being carried on with the wall 9, will cause the blade elements 22 to pivot in counterclockwise direction (in the direction of rotation) about their pivots 21 and therefore fold in toward the hub portion 13. Thus the blade elements will pass into the inner portion of chamber 25, whereas the finely divided material will stay at the outer portion due to centrifugal force. Thus the blade elements may be said to be removed from the finely divided material due to the pressure of the finely divided material acting thereon. It will be seen that the blade elements are folding or collapsible blade elements which are prevented from moving beyond normal working position when swung outward, but which may fold or collapse inwardly in case there is any tendency for the driven member to run faster than the driving member.

While the blade elements are shown with axially extending outer surfaces and the inside surface of the wall 9 is cylindrical, it is obvious that other shapes may be given to these parts. It is essential, however, that, in normal working position, the blade elements have their outer and end surfaces substantially parallel to and substantially close to the inside wall of the drum. The distance should be sufficient so that a particle of the finely divided material will not jam between the blade element and the inner wall of the chamber, but should not be appreciably greater than, for example, twice the diameter of the average particle. If this space is made too large, the drift will not form properly. By outer and end surfaces, in this connection, I mean the outer surfaces which extend axially in the preferred embodiment discussed and the outer portions of the narrow side or side end surfaces, that is, the portions which would contact the finely divided material if the finely divided material were evenly distributed in a layer on the inside cylindrical surface of the chamber.

The ports 27 and cut-away portions 28 permit the finely divided material to divide itself equally between the parts of chamber 25 separated by the blade elements, a feature which is important for providing balanced operation and consequently smooth running.

It will be seen that the collapsible blade feature may be used in clutches other than those operating on the principle of formation and packing of a drift.

While I have described one form of my invention, it will be understood that it may be carried out in a great variety of forms.

What I claim is:

1. A clutch comprising coaxially mounted relatively rotatable driving and driven members forming a chamber for the reception of finely divided material and means for establishing a driving relation between the driving and driven members comprising elements movable with one of said members and projecting into said chamber, said elements being movable due to pressure thereagainst of the finely divided material to permit the driven member to rotate faster than the driving member.

2. A clutch comprising coaxially mounted relatively rotatable driving and driven members forming a chamber for the reception of finely divided material and means for establishing a driving relation between the driving and driven members comprising elements pivotally attached to one of said members and projecting into said chamber, said elements being movable due to pressure thereagainst of the finely divided material to permit the driven member to rotate faster than the driving member.

3. A clutch comprising coaxially mounted relatively rotatable driving and driven members forming a chamber for the reception of finely divided material and means for establishing a driving relation between the driving and driven members comprising elements movable with said driving member and projecting into said chamber, said elements being movable due to pressure thereagainst of the finely divided material to permit the driven member to rotate faster than the driving member.

4. A clutch comprising coaxially mounted relatively rotatable driving and driven members forming a chamber for the reception of finely divided material and means for establishing a driving relation between the driving and driven members comprising elements pivotally attached to one of said members and projecting into said chamber, said elements being movable due to pressure thereagainst of the finely divided material to permit the driven member to rotate faster than the driving member and said members and elements being mounted on parallel axes.

5. A clutch comprising rotatable driving and driven members coaxially mounted and forming a chamber for the reception of finely divided material and elements movable with one of said members and projecting into said chamber for establishing a driving relation by contact with the finely divided material, said elements having a given normal power-transmitting position and cooperating with a quantity of finely divided material partially filling said chamber and having an appreciable coefficient of internal friction to form drifts of the finely divided material for transmitting power from the driving member to the driven member due to packing of the drifts under centrifugal force and providing overload release, and said elements being movable out of power-transmitting position due to pressure thereagainst of the finely divided material to permit the driven member to have substantially free overrunning movement.

6. A clutch comprising rotatable driving and driven members coaxially mounted and forming a chamber for the reception of finely divided material and elements pivotally attached to one of said members and projecting into said chamber for establishing a driving relation by contact with the finely divided material, said elements having a given power-transmitting position and cooperating with a quantity of finely divided material partially filling said chamber and having an appreciable coefficient of internal friction to form drifts of the finely divided material for transmitting power from the driving member to the driven member due to packing of the drifts under centrifugal force and providing overload release, and said elements being movable out of power-transmitting position due to pressure thereagainst of the finely divided material to permit the driven member to have substantially free overrunning movement.

7. A clutch comprising rotatable driving and driven members coaxially mounted and forming a chamber for the reception of finely divided material and elements pivotally attached to one of said members and projecting into said chamber for establishing a driving relation by contact with the finely divided material, said elements having abutments cooperating with the member to which it is attached providing a given normal power-transmitting position and cooperating with a quantity of finely divided material partially filling said chamber and having an appreciable coefficient of internal friction to form drifts of the finely divided material for transmitting power from the driving member to the driven member due to packing of the drifts under centrifugal force and providing overload release, and said elements being movable out of power-transmitting position due to pressure thereagainst of the finely divided material to permit the driven member to have substantially free overrunning movement.

8. A clutch comprising rotatable driving and driven members coaxially mounted and forming a chamber for the reception of finely divided material and elements pivotally attached to one of said members and projecting into said chamber for establishing a driving relation by contact with the finely divided material, said elements having a given normal power-transmitting position and cooperating with a quantity of finely divided material partially filling said chamber and having an appreciable coefficient of internal friction to form drifts of the finely divided material for transmitting power from the driving member to the driven member due to packing of the drifts under centrifugal force and providing overload release, and said elements being movable out of power-transmitting position due to pressure thereagainst of the finely divided material to permit the driven member to have substantially free overrunning movement, said members and elements being mounted on parallel axes.

9. A clutch comprising rotatable driving and driven members coaxially mounted and forming a chamber for the reception of finely divided material and elements movable with said driving member and projecting into said chamber for establishing a driving relation by contact with the finely divided material, said elements having a given normal power-transmitting position and cooperating with a quantity of finely divided material partially filling said chamber and having an appreciable coefficient of internal friction to form drifts of the finely divided material for transmitting power from the driving member to the driven member due to packing of the drifts under centrifugal force and providing overload release, and said elements being movable out of power-transmitting position due to pressure thereagainst of the finely divided material to permit the driven member to have substantially free overrunning movement.

10. A clutch comprising rotatable driving and driven members coaxially mounted and forming a chamber for the reception of finely divided material and elements pivotally attached to said driving member and projecting into said chamber for establishing a driving relation by contact with the finely divided material, said elements, having abutments cooperating with the driving member providing a given normal power-transmitting position and cooperating with a quantity of finely divided material partially filling said chamber and having an appreciable coefficient of internal friction to form drifts of the finely divided material for transmitting power from the driving member to the driven member due to packing of the drifts under centrifugal force and providing overload release, and said elements being movable out of power-transmitting position due to pressure thereagainst of the finely divided material to permit the driven member to have substantially free overrunning movement, said members and elements being mounted on parallel axes.

11. A clutch comprising rotatable coaxially mounted driving and driven members forming a chamber for the reception of finely divided material and movable blades attached to one of said members and pivotally mounted to swing within said chamber, each blade having axially extending side driving surfaces and an axially extending outer surface, said blades being positioned to rotate within said chamber and a quantity of finely divided material partially filling said chamber having an appreciable coefficient of internal friction and of such nature as to collect in drifts in front of the blades on relative rotation of said members and to present increasing resistance to relative rotation due to centrifugal force caused by rotation.

12. A clutch compirsing rotatable coaxially mounted driving and driven members forming a chamber for the reception of finely divided material and blades pivoted axially having axially extending side driving surfaces and an axially extending outer surface, the driven member comprising a drum, said blades being positioned to rotate within said drum and a quantity of finely divided material partially filling said drum having an appreciable coefficient of internal friction and of such nature as to collect in drifts in front of the blades on rotation thereof relative to the drum and to present increasing resistance to relative rotation due to centrifugal force caused by rotation.

13. A clutch comprising rotatable coaxially mounted driving and driven members, the driving member comprising a hub portion, the driving and driven members forming a chamber, a quantity of finely divided material partially filling said chamber having an appreciable coefficient of internal friction, and movable blades mounted on said hub portion, each having an axially extending side driving surface and an outer surface, each blade having a normal working position wherein the outer surface is relatively close to the outer wall of the chamber and each blade operating, in normal working position, to form a drift of the finely divided material.

14. A clutch comprising rotatable coaxially mounted driving and driven members, the driving member comprising a hub portion, the driving and driven members forming a chamber, a quantity of finely divided material partially filling said chamber having an appreciable coefficient of internal friction, and pivoted blades mounted on said hub portion, each having an axially extending side driving surface and an outer surface, each blade having a normal working position wherein the outer surface is relatively close to the outer wall of the chamber and each blade operating, in normal working position, to form a drift of the finely divided material.

15. A clutch comprising rotatable coaxially mounted driving and driven members, the driving member comprising a hub portion, the driving and driven members forming a chamber, a quantity of finely divided material partially filling said chamber having an appreciable coefficient of internal friction, and blades mounted on said hub portion on axially extended pivots and adapted to be moved outwardly by centrifugal force, each blade having an axially extending side driving surface and an outer surface, means for determining a normal working position of said blades wherein the outer surface of each blade is relatively close to the outer wall of the chamber and each blade operating, in normal working position, to form a drift of the finely divided material.

16. In a clutching device, a member providing a casing, a second member rotatably mounted in said casing, said members providing a closed chamber therebetween, and a quantity of finely divided material partially filling said chamber, one of said members comprising blades pivoted to swing in said chamber and having surfaces for forming said material into a plurality of drifts upon rotation thereof, said surfaces having different axial extent at different distances from the axis of rotation with respect to the axial extent of the chamber at corresponding distances from the axis of rotation.

17. In a clutching device, a member providing a casing, a second member rotatably mounted in said casing, said members providing a closed chamber therebetween, and a quantity of finely divided material partially filling said chamber, one of said members comprising blades pivoted to swing in said chamber and having surfaces for forming said material into a plurality of drifts upon rotation thereof, said surfaces having different axial extent at different distances from the axis of rotation with respect to the axial extent of the chamber at corresponding distances from the axis of rotation, said blades being automatically movable to radial position on operation of the clutch.

18. A clutch for transmitting power comprising a member providing a casing, a second member rotatably mounted in said casing, said members providing a closed chamber therebetween, said second member comprising a plurality of blades pivoted to swing in said chamber, and a quantity of finely divided material partially filling said chamber and of such nature as to collect in drifts in front of the blades on rotation thereof relative to the casing, radially outward portions of said blades having edges close to the casing, openings being provided within the chamber nearer than said edges to the axis of rotation to provide free passage for said material past the blades at points inward of said edges to balance the material in the clutch.

19. A clutch for transmitting power comprising a member providing a casing, a second member rotatably mounted in said casing, said members providing a closed chamber therebetween, said second member comprising a plurality of blades pivoted to swing in said chamber, and a quantity of finely divided material partially filling said chamber and of such nature as to collect in drifts in front of the blades on rotation thereof relative to the casing, radially outward portions of said blades having edges close to the casing, openings being provided within the chamber nearer than said edges to the axis of rotation to provide free passage for said material past the blades at points inward of said edges to balance the material in the clutch.

20. In a clutching device, a blade wheel, a drum rotatably surrounding said blade wheel so as to form an annular space therearound, a powdered material in said drum, and blades hinged to the said blade wheel by axial pivots and acting as operative abutments upon pressure of the powdered material on one side, and collapsible to unclutch upon pressure of the powdered material on the other side.

21. In a clutching device, a blade wheel, blades connected to said wheel by axial pivots allowing the blades to automatically swing from an operative to an inoperative position upon preponderance of pressure on one side thereof, means on said blades to cooperate with said wheel to hold the blades in operative position upon preponderance of pressure on the other side thereof in the normal operation of the device, a casing rotatably surrounding said wheel, and a powdered material in said casing.

22. In a clutching device, a blade wheel, a drum surrounding and relatively rotatable with respect to said wheel to form an annular space, a powdered material in said drum, blades hinged to said wheel freely movable in one direction and having tails engaging the wheel and to limit the movement of the hinged blades substantially to radial position in the other direction.

23. A clutch comprising an inner rotatable member, an outer member rotatably mounted on said inner member, axially disposed pivot pins carried by said inner member, and blades pivotally mounted on said pins and movable outwardly due to centrifugal force, said blades having abutment projections adapted to contact said inner member to hold the blades in operative position.

24. A clutch comprising an inner rotatable member, an outer member rotatably mounted on said inner member, axially disposed pivot pins carried by said inner member, and blades pivotally mounted on said pins and movable outwardly due to centrifugal force, said blades having abutment projections adapted to contact said inner member to hold the blades in operative position, said blades in operative position being out of contact with said outer member.

25. A clutch comprising an inner rotatable member, an outer member rotatably mounted on said inner member, axially disposed pivot pins carried by said inner member, and blades pivotally mounted on said pins and movable outwardly due to centrifugal force, said blades having abutment projections adapted to contact said inner member to hold the blades in operative position, said blades in operative position having axially extending surface adjacent but out of contact with said outer member.

26. The method of transmitting power between a driving member and a driven member which comprises disposing a mass of finely divided material having an appreciable coefficient of internal friction with relation to the driven member so as to be carried thereby, moving a driving element in contact with the mass so as to form a drift of the mass and thereby moving the mass and the driven member, generating centrifugal force due to movement of the mass to increase the internal resistance thereof and thereby causing the mass to become rigid and to drive the driving and driven members synchronously, transmitting power at synchronous speed through the mass so treated and automatically moving the driving element out of power-transmitting contact with the mass when the driven member tends to move faster than the driving member to permit the driven member to have substantially free overrunning movement.

In witness whereof I have hereunto affixed my signature.

CARL AUGUST RUDQVIST.